July 19, 1932. O. J. KAY Re. 18,531

VALVE ACTUATING MECHANISM

Original Filed Nov. 9, 1929

INVENTOR.
OSCAR J. KAY
BY
ATTORNEYS.

Reissued July 19, 1932

Re. 18,531

UNITED STATES PATENT OFFICE

OSCAR J. KAY, OF GLENDALE, CALIFORNIA

VALVE ACTUATING MECHANISM

Original No. 1,814,045, dated July 14, 1931, Serial No. 406,020, filed November 9, 1929. Application for reissue filed February 16, 1932. Serial No. 593,403.

My invention relates to valves generally, and specifically to gas valves for water heaters, and an object of the invention is to provide positively acting means for automatically controlling the movement of a valve disk relative to the port of a valve body and in operative response to temperature changes occurring in the regular function of heaters of this class.

An important object of the invention resides in the manner of co-ordinating the spring of my valve disk with the controlling mechanism of a heater organization so that in the regular functioning of the heater, force will be positively and timely transmitted to the spring at points diametrically of the disk to flex the spring and thereby move the disk along an axial line relative to the port in the gas line.

I will describe only one form of valve actuating mechanism embodying my invention and in its association with a conventional form of thermo-responsive device and gas valve, where the former is operable by the pilot light of a water heater, and will then point out the novel features thereof in claims.

My invention in its present embodiment comprises in the main a valve body, an element movable in the valve body to occupy either of two extreme positions, a valve for controlling the flow of liquid through the valve body, and a resilient member supported by the valve body and the element, and connected to the valve so that normally the member retains the valve in open position and the element in one extreme position, but when the element is forcibly moved to its other extreme position, the member is flexed in a manner to move the valve to closed position.

Figure 1:
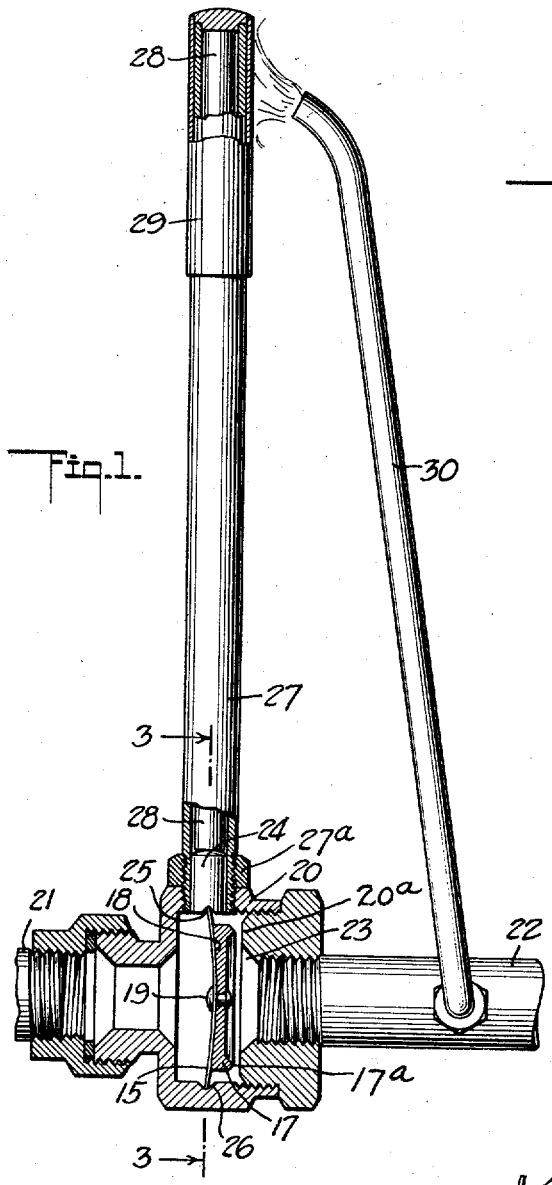
Figure 1 is a view showing in vertical section and partly in elevation, one form of valve actuating mechanism embodying my invention in association with a gas valve and thermo-responsive device where the latter is operable by a pilot light.
Figure 4:
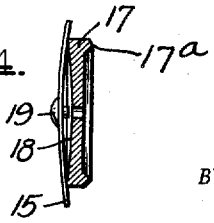
Figure 4 is a vertical detailed view of the valve and spring shown in the preceding views to illustrate the normal curvature of the spring and before it is attached to the valve.

In the specific embodiment of my invention herein illustrated, the resilient member is in the form of a leaf spring 15, the normal curvature of which, that is, its curvature before being applied to the valve 17, is substantially equal and opposite to the curvature of the concave side 18 of the valve, as illustrated in Figure 4. A rivet 19 is extended immediately through the spring 15 and axially into the valve 17 for securing the spring to the concave side of the valve. By reason of the concavity of such side, the spring as secured to the valve is flexed to a curvature substantially reverse to its normal curvature, as shown in Figure 1, but it will be understood that it still retains its tendency to return to its normal curvature, an important feature in the operation of the valve.

The valve body above referred to is shown as a pipe fitting 20 for connecting adjacent sections 21 and 22 of a pipe line for gas or other fluid, where one section 21 leads to a gas burner (not shown), and the other section 22 to a source of gas supply. This valve body 20 contains the valve 17 for controlling the flow of gas from the pipe section 22 to the other pipe section 21 through a port 23, so that when the valve is opened, gas can be supplied to the gas burner.

The valve body 20 is tapped to receive the aforementioned element, and this element is in the form of a plug 24 which is movable in the valve body to occupy the two extreme positions mentioned. The lower end of the plug, and the lower inner wall of the valve body, are notched, as indicated at 25 and 26, respectively, to receive the ends of the spring 15, and to thus support the spring in vertical position, with the attached valve 17 occupying a corresponding position.

In the normal position of the plug 24, that is, when it is in its upper extreme position, the spring is free to assume its normal position as attached to the valve and in which the valve is held in open position. Of course, the spring constantly tends to assume that curvature which it originally had before its attachment to the valve, but by reason of the concavity of the valve wall, the spring is restrained against assuming such a curvature, and which, if permitted, would result in the spring moving past a dead center position, in which it would be impossible to return the valve to its normal open position, or to closed position, that is, through operation of the plug.

Figure 2:
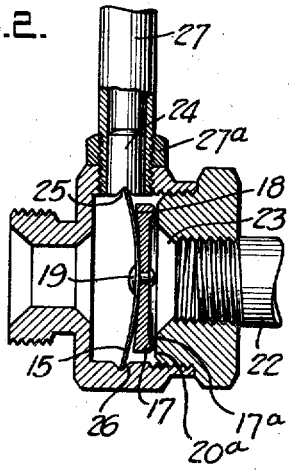
Figure 2 is a fragmentary vertical sectional view showing the gas valve in closed position and is distinguished from the open position of the valve illustrated in Figure 1.

By forcing the plug 24 downward to its lower extreme position, the spring is flexed to the right as when viewed in Figure 2, to move the valve to closed position with respect to the port 23. Only a small degree of movement of the plug is necessary to effect such a closure of the valve because its movement is greatly compounded in the flexing movement of the spring. It is important that the spring be connected to the valve as described, in order to allow sufficient independent movement of the valve to accommodate itself to any irregularities in the surface against which it seats and to thereby secure complete closure of the port.

In the adaptation of my invention to a pilot light for water heaters to discontinue the supply of gas to the main burner, and which supply is also controlled by a thermo-operated valve (not shown) as in storage heaters, the plug 24 is mounted for vertical movement in an expansible tube 27 threaded at its lower end in the valve body 20 and welded at its upper end to non-expanding rod 28 contained in the tube and having its lower end abutting the upper end of the plug 24. The usual sleeve 29 of non-corrosive metal surrounds the upper portion of the tube 27 against which the flame plays when the pilot is lighted. The pilot tube 30 extends upwardly from its point of connection with the pipe section 22, from which latter it receives a supply of gas.

Figure 3:
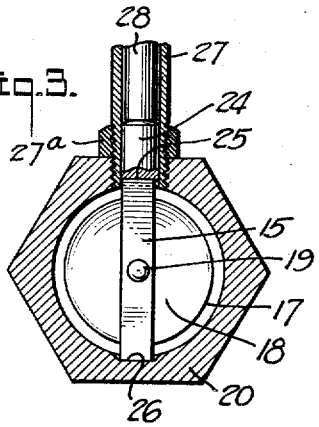
Figure 3 is a vertical sectional view taken on the line 3—3 of Figure 1.

In the operation of my invention as used in conjunction with a pilot light, contraction of the tube 27 functions through the rod 28 to move the plug 24 downward and to thus flex the spring 15 and thereby close the valve 17. As will be understood, the tube 27 contracts after the pilot light is extinguished in order to discontinue further gas supply to the burner of the heater in the event that the thermo-operated valve opens with the pilot extinguished. Conversely, when the pilot is lighted, the tube 27 expands and through the medium of the rod 28 permits the plug 24 to move upwardly, thereby allowing the spring to return to its normal position in which the valve is moved to open position. The valve 17 is in the form of a circular disk, (Figure 3) and same is provided with an annular rib 17*a* at its side opposite the flat seat surface 20*a* of the aforementioned valve body 20, the said surface 20*a* co-acting with the rib 17*a*, when the valve is in one of its extreme positions, whereby to positively seal the port 23 against the passage of gas therethrough.

It follows from what has been said that the tube 27 may be manually adjusted in a vertical direction so that the lower end of the rod 28 may be brought to bear against the upper end of the plug 24 to urge the latter in a downward direction against the upper end of the spring 15, whereby to enable the operator to initially set or adjust the valve 17 relative to its seat. When the intended adjustment of the plug 24 has been effected, same may be held from accidentally shifting by turning the clamp nut 27*a* tightly against the adjacent upper face of the body 20 as shown in Figures 1 and 2 of the drawings.

Although I have herein shown and described only one form of valve actuating mechanism embodying my invention, it is to be understood that various changes and modifications may be made herein without departing from the spirit of the invention and the spirit and scope of the appended claims.

I claim as my invention:

1. As an article of manufacture, a valve having a substantially concave side, a leaf spring tending to assume a curvature which is opposed to the concave side of the valve, and means securing the spring to the concave side of the valve so that the spring is flexed to a curvature corresponding to the curvature of said side.

2. In combination, a valve body having a port, an element movable in the body to occupy either of two extreme positions, means for moving the element to either of said positions, a valve in the body for controlling the port and having a substantially concave side, a leaf spring tending to assume a curvature which is opposed to that of the concave side of the valve, said body and element engaging the spring respectively at its ends so that when the spring is flexed in one extreme position the spring will act to close the valve, and when the spring is partially straightened to the other extreme position, it will act to open the valve.

3. In combination, a valve body having a port, an element movable in the body to occupy either of two extreme positions, a valve in the body for controlling the port, and a leaf spring secured to the valve, said body element engaging the respective ends of the spring so that when said element is in one extreme position the spring is flexed to close the valve, and when said element is in the other extreme position the spring returns to its normal position, thus acting to open the valve, the said valve and said body mutually co-acting to completely seal the port when the body occupies one of its extreme positions.

4. In combination, a body having a port; a valve controlling the port and adapted when in one position to entirely close same; an element mounted for movement in a direction radially relative to the port; and a leaf spring secured intermediate its ends to the valve and extending diametrically thereof with one end of the spring engaging the body and the other end engaging said element for operation in supporting the valve and moving the latter axially relative to the port in response to said movement of the element.

5. In combination, a body having a port; a valve controlling the port and adapted when in one position to entirely close same; an element mounted for movement in a direction radially relative to the port; and a leaf spring confined between the body and element in a curved position longitudinally and secured intermediate its ends to the valve, for operation in supporting the valve and moving the latter axially relative to the port in response to movement of the element.

6. In combination, a body having a port; a valve in the body for controlling the port and adapted when in one position to entirely close same; a leaf spring secured intermediate its ends to the valve and extending diametrically thereof; means in the body for supporting the spring from its respective ends; means for manually tensioning the spring to adjust the valve with respect to the port; and thermally controlled means co-operable with the spring to influence same and automatically move the valve relative to the port.

7. In combination, a body having a port, a valve controlling the port and operable when in one position to entirely close same, a leaf spring secured intermediate its ends to the valve, and thermally responsive mechanism, including portions abutting the opposite end edges of the spring and relatively movable in opposite directions radially with respect to the axis of the valve.

OSCAR J. KAY.